US009775001B2

(12) United States Patent
Dunkin et al.

(10) Patent No.: US 9,775,001 B2
(45) Date of Patent: Sep. 26, 2017

(54) METHOD AND SYSTEM OF PROVIDING DATA SERVICE ACCORDING TO A USER'S FUTURE LOCATION

(71) Applicant: VODAFONE IP LICENSING LIMITED, Newbury, Berkshire (GB)

(72) Inventors: Andrew Dunkin, London (GB); Usman Javaid, London (GB); Nikolaos Lioulis, London (GB); Sandra Bender, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 14/777,464

(22) PCT Filed: Mar. 3, 2014

(86) PCT No.: PCT/GB2014/050614
§ 371 (c)(1),
(2) Date: Sep. 15, 2015

(87) PCT Pub. No.: WO2014/140526
PCT Pub. Date: Sep. 18, 2014

(65) Prior Publication Data
US 2016/0037304 A1 Feb. 4, 2016

(30) Foreign Application Priority Data

Mar. 15, 2013 (GB) .................................. 1304809.5

(51) Int. Cl.
*H04W 24/00* (2009.01)
*H04W 4/02* (2009.01)
(Continued)

(52) U.S. Cl.
CPC ........ *H04W 4/027* (2013.01); *G01C 21/3415* (2013.01); *G01C 21/3446* (2013.01);
(Continued)

(58) Field of Classification Search
CPC ..... H04W 4/027; H04W 4/028; H04W 4/046; H04W 24/02; H04W 36/0083;
(Continued)

(56) References Cited

U.S. PATENT DOCUMENTS 8,705,527 B1 * 4/2014 Addepalli ............. H04W 4/046
370/389
2004/0085909 A1 5/2004 Soliman et al.
(Continued)

FOREIGN PATENT DOCUMENTS

EP 1598985 A1 11/2005
EP 1737160 A1 12/2006
(Continued)

OTHER PUBLICATIONS

CCD view for GB20130004809, retrieve online http://ccd.fiveipoffices.org/CCD-2.0.4/html/viewCcd.html?num=GB2 on Dec. 15, 2015.
(Continued)

*Primary Examiner* — Keith Fang
(74) *Attorney, Agent, or Firm* — Workman Nydegger (57) ABSTRACT

According to one aspect of the present invention there is provided a method for controlling data service for a vehicle-based user of a telecommunication network. The method comprising: retrieving data associated with location behavior of the user within the network; predicting, based on said data and on a current user location within the network, a future user location within the network; performing a determination of network capability at the future user location; and modifying, in response to the determination, a configuration of the network and/or a service parameter associated with the user. A network element, system and computer program product are also provided.

11 Claims, 4 Drawing Sheets

(51) Int. Cl.
  *H04L 29/08* (2006.01)
  *H04W 4/04* (2009.01)
  *H04W 24/02* (2009.01)
  *H04W 36/00* (2009.01)
  *H04W 40/34* (2009.01)
  *G01C 21/34* (2006.01)
  *H04W 88/08* (2009.01)

(52) U.S. Cl.
  CPC ......... *H04L 67/2847* (2013.01); *H04W 4/028* (2013.01); *H04W 4/046* (2013.01); *H04W 24/02* (2013.01); *H04W 36/0083* (2013.01); *H04W 40/34* (2013.01); *H04W 88/08* (2013.01)

(58) Field of Classification Search
  CPC .. H04W 40/34; H04W 88/08; G01C 21/3415; G01C 21/3446; H04L 67/2847
  See application file for complete search history.

(56) References Cited

U.S. PATENT DOCUMENTS

| | | | | |
|---|---|---|---|---|
| 2006/0286988 | A1* | 12/2006 | Blume | G01C 21/3679 455/456.1 |
| 2007/0217349 | A1* | 9/2007 | Fodor | H04L 12/5692 370/310.2 |
| 2010/0323715 | A1 | 12/2010 | Winters et al. | |
| 2012/0009890 | A1* | 1/2012 | Curcio | H04L 29/06 455/230 |
| 2015/0124597 | A1* | 5/2015 | Mabuchi | H04L 12/413 370/230 |

FOREIGN PATENT DOCUMENTS

| | | |
|---|---|---|
| EP | 2088818 A2 | 8/2009 |
| EP | 2403290 A1 | 1/2012 |
| WO | WO9613951 A1 | 5/1996 |
| WO | WO9830045 A2 | 7/1998 |
| WO | WO2005064969 A1 | 7/2005 |
| WO | WO2011150971 A1 | 12/2011 |

OTHER PUBLICATIONS

International Search Report for PCT/GB2014/050614 dated May 23, 2014.
UKIPO Search Report for GB1304809.5 dated Aug. 20, 2013.

* cited by examiner

METHOD AND SYSTEM OF PROVIDING DATA SERVICE ACCORDING TO A USER'S FUTURE LOCATION

BACKGROUND

Operators of cellular telecommunications networks are ever trying to improve the efficiency of the networks and optimise network performance as poor customer experience and service loss can result in customer dissatisfaction. In conventional cellular telecommunications networks, when the user is requesting a data service, such as downloading an application or streaming audio or video data, the quality of service provided to that user is directly related to network conditions for example radio coverage and delay. If the user moves into a white spot while requesting data service, for example while travelling in a car or on a train, the data service may be interrupted (i.e. will stop receiving the data service until coverage is recovered) or may be lost completely as the data link may be damaged. A white spot is a term used in the art to describe a geographical region lacking radio coverage. Such a loss of data service results in customer dissatisfaction and often customer complaints. There is therefore a need to reduce the effects of poor service coverage on the end user in order to improve the customer experience.

It has previously been described, for example in European Patent Publication No. 2,403,290, that a network operator may be able to gauge future radio conditions experienced by a user by prediction. In order to make this prediction, the network may build and maintain a record of radio quality across a coverage area of the network and may use this record to predict the radio conditions available to the mobile terminals within that coverage area. The network will typically calculate the present location and/or velocity of the user in order to predict the future location of that user. By consulting the record of radio quality across the coverage area the network is able to estimate the radio conditions available to that mobile terminal at a future location.

If it is determined that future radio conditions are poor then the network may increase the data throughput provided to that user at its present location. The user can then store this received information in a buffer so that the data is temporarily stored for future use when the radio conditions are poor. Alternatively, if it is determined that future radio conditions are good, then the network may decrease the data throughput provided to that user at its present location since the user will not need to use stored data at the future location in order to receive a constant service.

Additionally, it is known from for example European Patent Publication No. 2,555,569, that network parameters (such as resource allocation and resource prioritisation, radio parameters and Quality of Service, QoS, parameters) and service parameters (such as resolution and time of delivery) can be adjusted for a specific data service based on the future radio conditions determined using the current location and velocity of the user. Predicting the future location of a user based on current location and velocity in this way is highly inaccurate as a simple left turn will dramatically alter the predicted destination. The future location could be recalculated after this turn but this would impose large overheads and require constant iterative recalculation. There would also be only a period of time in the future that the location could be predicted for. There can be no accurate long term prediction of coverage.

In U.S. Pat. No. 6,125,278 it has been described that location data can be sent from the user to the network and combined with current location and velocity data to predict the future location of the user. Whilst this may increase the accuracy of location prediction over the use of current location and velocity data alone, the inaccuracy of this method is still undesirable and the use of device information in this way introduces undesirable data and processing overheads into the system.

When one or more users are travelling in a vehicle, especially one travelling at a high speed such as a train, all of the on-board users (each of which may be considered a network subscriber) may experience areas of poor or no coverage at intervals. This may degrade the user experience, especially for streaming and conversational class services (such as audio or video streaming, voice calls or video calls), but also for interactive class services, such as web browsing. This may result from intermittent degradations or interruptions to the radio access network coverage. Improving the user experience, despite the poor or lacking coverage, remains a challenge.

SUMMARY OF THE INVENTION

According to a first aspect, there is provided a method for controlling data service for a user of a telecommunication network, the method comprising: retrieving data associated with historical behaviour of the user within the network; predicting, based on said data and on a current user location within the network, a future user location within the network; performing a determination of network capability at the future user location; and modifying, in response to the determination, a configuration of the network and/or a service parameter associated with the user. According to this first aspect, there may be particularly provided a method for controlling data service for a vehicle-based user of a telecommunication network, the method comprising: retrieving data associated with location behaviour of the user within the network; predicting, based on said data and on a current user location within the network, a future user location within the network; performing a determination of network capability at the future user location; and modifying, in response to the determination, a configuration of the network and/or a service parameter associated with the user.

In determining future location in this way the method is able to accurately determine future location. For example, the method is able to predict whether a user travelling in a vehicle while requesting data service and approaching a junction will turn left, right or continue straight on without receiving substantial information from the device. Known methods must assume a constant direction of travel. Further, the method is able to accurately predict long term future location as well as location in the immediate future so that modifications can be appropriately planned and the effects of the modifications accurately predicted.

The invention may be especially applied to a vehicle-based user, which may have a limited range of freedom in its location. For example, certain types of users may be limited to a defined (and possibly limited) range of locations, such as train-based users. In this case, the data associated with location behaviour of the user within the network may comprise timetable or scheduling information for the vehicle. Thus, a current user location within the network may be determined using the timetable or scheduling information and a current time. In some embodiments, the data associated with location behaviour of the user within the network may comprise information obtained external to the network.

By modifying configuration of the network the method is able to adjust the service offered near to any potential white spot or other area of degraded coverage as well as the service offered at the current location. The term degraded coverage may mean an actual degradation and/or predicted degradation. Additionally, the method is able to appropriately provide consistent service to the user while managing and mitigating other effects of the modification. The determination of network capability at the future user location may identify white spots and/or areas of sub-maximal capacity or throughput for the user, for example areas where the capacity (in terms of data rate or bandwidth) or throughput (also in terms of data rate or bandwidth) for the user are no greater (or less) than a pre-determined threshold or reduced to no greater (or less) than a pre-determined proportion of the maximal capacity. The step of performing a determination of network capability at the future user location may comprise determining that an expected communication throughput between the network and the user at the future user location is no greater than a predetermined threshold. Such determinations may be based on an expected link quality (such as one or more of signal strength, signal-to-noise ratio or similar) for the user at the future user location. A determination of degraded coverage (that is, degraded link quality) may be based on network characteristics (such as one of more of radio propagation, transmission power and transmission mode, for instance) and/or by congestion due to a predicted future throughput at the future user location. For example, if a vehicle (such as a train) is approaching a stopping point such as a station, where it can be predicted that a gateway user will receive a surge of end users, then the network and/or user may take mitigating actions in advance of this, such as caching.

In some embodiments, the user can be a single network subscriber. In some embodiments, the user can comprise a vehicle-based gateway. The gateway may be configured to provide access to the telecommunications (mobile) network to at least one (and preferably a plurality of) subscriber terminals (User Equipment, UE), user device or other types of device, on-board the vehicle. The gateway may act as a form of mobile relay node or vehicle coverage node. In particular, the gateway may be configured to store and/or buffer data transmitted by the network. This may improve the subscriber experience, for example in ways that will be discussed below. Where the user is a gateway, one or more than one subscriber or other user may access the network through the gateway. This may be in a way that is transparent to the network (such that the network is able to identify the subscribers or user devices accessing the network through the gateway) or in a way that is hidden from the network (for example, the network may simply see the gateway as a single user device, although the gateway may, in fact, be acting as a traffic conduit for multiple user devices. An advantage of this architecture may be a reduction in signalling overhead between the vehicle and the network.

The user may be accessing the network to obtain a plurality of data services. The traffic between the network and the user may be differentiated according to the respective service to which the traffic relates. For example, LTE provides EPS (Evolved Packet System) bearers. In some embodiments, the user is initially assigned a default bearer. The default bearer (a single default bearer may be required by LTE standards, but more than one may optionally be assigned) may be allocated a Quality of Service (QoS), which is typically best effort. Then, the user may be assigned one or more additional bearers (this/these may be dedicated bearers), each of the one or more additional bearers having an allocated minimum QoS, which may be lower or higher than or the same as the QoS for the default bearer. For example, the one or more additional bearers may be allocated a guaranteed bit rate QoS. The one or more additional bearers may be provided for dedicated services (such as VoIP). Where the user is a gateway, each bearer may correspond with traffic for a device accessing the network through the gateway. Additionally or alternatively, each bearer may correspond with a type of service that the device is (or devices are) accessing through the gateway. Thus, the gateway and/or network may bundle traffic for different devices (users or subscribers) in one bearer. For example, this may advantageously allow traffic of the same service type but for different devices to be communicated using the same bearer.

The modifying step may be optionally performed in accordance with a profile of the user. For example, certain actions may be taken based on the data consumption, contract details and payment information of the user. In this way the service can be tailored to the needs of the operator and user to provide a consistent experience to those important users who are identified by the operator as having a degree of importance based, for example, on their role, their data consumption or their price plan. In some embodiments, the profile of the user may indicate that it is a gateway. This may be indicated by the priority assigned to the user, for example.

The modifying step may also be optionally performed based on a data service requested by the user. For example, if the data service is a streaming service, certain actions may be performed to ensure the stream is not lost whereas if the data service is email then other actions may be taken in order to mitigate effects on other users.

The method may further comprise tracking the user within the network using information about handover and cell connections. In this way the location of the user can be approximately determined without device information. The user could also be tracked for example using a GPS location of the user or using a triangulation method to locate the user.

The method may further comprise calculating a probable user route between the current user location and the future user location. The predicting step may also include predicting a series of future locations. The method may further comprise calculating a probable user route based on the series. Further, the method may comprise detecting user deviation away from the route. Additionally, in response to detection of user deviation away from the route, the method may comprise recalculating the series and recalculating the route. For example, a user might change route from the predicted route and choose an alternative one. The user can be tracked in one example by using the user's location or based on cell connections and cell handovers.

The modifying step may also include providing instructions to a base station of the telecommunication network. Thus the modification can be tailored to the service provided. Further, the base station may be a base station located between the current user location and the future user location wherein the future user location is a white spot. In this way, the customer experience is improved as the user travels through an area of coverage deficiency. The base station may also be a base station located adjacent the future location within the network such that customer experience is effectively optimised during the area of coverage deficiency. The modifying step may comprise increasing the network resources allocated to the user, for example transmission power, scheduling resources, priority resources.

The location behaviour may be historical behaviour, which may include cell connections, cell measurements and/or requested data services. Thus the future location can be predicted without substantial information transmitted by the device. In some cases, the analysed behaviour may comprise or further comprise externally obtained information such as scheduling information for public transport vehicles or similar, as discussed above.

The modifying step may comprise: tilt adjustment of a base station of the telecommunication network; beam steering; configuration of handover parameters; expanding a cell range of the telecommunication network; increasing transmit power of a base station of the telecommunication network; adjusting resources scheduled to the user; and/or, traffic steering. Other measures for the modifying step could be considered by the person skilled in the art, and these measures would be equally applicable to this invention so long as they would not require a substantial modification of the claimed steps.

Further, the modifying step may comprise identifying that the user is a priority user and/or adjusting a priority of the user. This may include increasing a scheduling priority of the user at the network.

The method may further comprise: communicating data from the network to the user for storage at the user, in response to the step of modifying. The method may then comprise: storing the communicated data at the user. For example, the data may comprise streaming class traffic data and the step of storing the communicated data may comprise storing sufficient data to cover a time period when the user is in the future user location within the network (such as an area of degraded or unavailable coverage). Additionally or alternatively, the step of storing the communicated data may comprise caching data for use during a time period when the user is in the future user location within the network. This may be useful for augmenting cache hit probability, particularly for interactive class traffic, such as web pages. Caching may be used to store data that the user (or a device accessing the network through the user acting as a gateway) may be predicted to access (using caching methodologies, such as automatically storing copies of web pages linked to a web page currently being accessed) or habitually accesses (based on a behaviour pattern for the user or the device accessing the network through the user, the behaviour pattern may be established and/or updated and/or stored by the gateway and/or network). Where the user is a gateway and there are a plurality of devices accessing the network through the gateway, the user may prioritise the traffic for each device and/or each type of service and the step of communicating data may then comprise communicating data in accordance with the prioritisation. For example, the gateway may prioritise conversational class traffic higher than non-conversational class traffic, for instance. Interactive class traffic may be prioritised higher than background and/or streaming class traffic, in some implementations. Then, scheduling and/or resource allocation for the communication of the data may be implemented in accordance with the prioritisation.

Optionally, the method may further comprise: establishing at the user that the configuration of the network and/or the service parameter associated with the user has been modified. In some embodiments, the step of establishing comprises signalling from the network to the user to store data communicated from the network to the user in response to the step of modifying. Such a signal may indicate that the step of modifying the network has taken place (and in some embodiments, nothing else). The method may further comprise: transmitting and/or receiving a request from the user to the network to communicate data for storage. The step of transmitting and/or receiving the request may take place in response to the step of signalling. However, this need not necessarily be the case. In embodiments, the request is transmitted and/or received without any signalling from the network. For example, where the user is a gateway and the network may have no visibility of the devices accessing the network through (also termed "behind") the gateway, it may not be straightforward for the network to determine whether requested content is for a single device or multiple devices, nor may it be possible for the network to identify the device (and/or a subscriber associated with the device) to which the traffic relates. The method may further comprise: configuring cache size and/or cache management strategies at one or both of the user and the network. Typically, the network will only be aware of the services requested by a gateway user and the priority of the gateway user, which may be adapted in the step of modifying, as discussed above.

The method may further comprise: using the stored data during a time period when the user is located at the future user location (and/or a location of degraded or no network coverage) within the network. In embodiments where the user is a gateway, the step of using the stored data may comprise communicating the stored data and/or information relating to the stored data from the gateway to a user device in communication with the gateway. The step of communicating the stored data and/or information relating to the stored data from the gateway to a user device may use the same communications interface and/or communications configuration as the communication between the gateway and the radio telecommunication network, which may be a cellular radio access technology such as GSM, UMTS or LTE. Alternatively, the step of communicating the stored data and/or information relating to the stored data from the gateway to a user device may use a different communications interface and/or communications configuration as the communication between the gateway and the radio telecommunication network. The gateway may communicate with the one or more user devices using Wireless Local Area Network (WLAN) technologies, such as WiFi. However the communications are made, a number of strategies may be employed when such store-and-forward approaches are used. In one embodiment, the step of using the stored data comprises communicating the stored data to a user device in communication with the gateway. This preferably takes place when the user is in the future user location within the network or another area of degraded or no network coverage.

In some embodiments, the method further comprises: detecting at the user that the user's location is in an area of degraded network coverage or no network coverage. This may be effected by signalling from the network or by other techniques. Where the user is a gateway, the method may further comprise: communicating data from the gateway to at least one device accessing the network through the gateway, in response to the step of detection. The communicated data may be stored data, as discussed above and/or other data (for example, an indication that network coverage has been reduced, an indication as to when network coverage may improve).

The predicting step may comprise performing statistical analysis on the data. Thus the future location can be predicted to a certain degree of probability.

In accordance with a further aspect of the present invention there may be provided a network element of a telecommunication network adapted to control data service for a user, the network element adapted to carry out any of the above steps.

In accordance with a further aspect of the present invention there may be provided a telecommunications network comprising a network element adapted to carry out any of the above steps, a user equipment, a radio access network comprising a base station and a core network.

In accordance with a further aspect of the present invention there may be provided a computer program comprising instructions which when executed by one or more of the processors cause a network element of a telecommunication network to perform any of the above steps. This computer program may be embodied in the form of a computer program product comprising memory, the instructions being stored on the memory.

In another aspect, the present invention may provide a vehicle-based gateway, comprising: a first (radio) communication interface for communication with a (radio or cellular) telecommunication network; a second (radio) communication interface for providing data service from the radio telecommunication network to at least one device on board the vehicle; and a storage system, configured to store data received from the telecommunication network through the first communication interface for subsequent communication to the at least one on board device through the second communication interface, when there is a degradation in a link quality of the first communication interface. The degradation in the link quality may be an actual degradation and/or a predicted degradation. Optionally, the storage system is configured to store data in response to a determination that the degradation in the link quality of the first communication interface will occur within a predetermined time period. For example, this determination may comprise receiving a signal from the radio telecommunication network. Preferably, the storage system is configured to detect the degradation in a link quality of the first communication interface (possibly by a signal from the radio telecommunication network or by measurement of the link quality using the first communication interface) and to communicate stored data (through the second communication interface) in response to the detection.

The vehicle-based gateway may be for a multi-passenger (public) transportation vehicle, such as a train, coach, bus or taxi, or another kind of vehicle. It may have any one or more of the features discussed above with reference to the methods of controlling data service that are implemented in connection with the user (whether or not the user is a gateway). For example, the first communication interface and the second communication interface may use the same radio access technology (such as a cellular radio access technology) or different radio access technologies.

The present invention may additionally provide, in a yet further aspect, a method of operating a vehicle-based gateway, comprising: communicating between the gateway and a (radio) telecommunication network through a first (radio) communication interface; communicating between the gateway and at least one device on board the vehicle in order to provide data service from the radio telecommunication network through a second (radio) communication interface; and storing data received from the radio telecommunication network through the first communication interface for subsequent communication to the at least one on board device through the second communication interface, when there is a degradation in a link quality of the first communication interface. This method may have features corresponding with the optional features discussed herein with respect to the vehicle-based gateway. There may also be provided a computer program, configured to carry out such a method when operated by a processor.

The combination of any specific group of features disclosed herein is also provided, even if that combination is not explicitly mentioned.

Clauses Indicating Auxiliary Aspects

The following auxiliary aspects indicate further aspects, which may be combined with features disclosed herein, not necessarily including the features of clause 1.

1. A method for controlling data service for a user of a telecommunication network, the method comprising:
retrieving data associated with historical behaviour of the user within the network;
predicting, based on said data and on a current user location within the network, a future user location within the network;
performing a determination of network capability at the future user location; and
modifying, in response to the determination, a configuration of the network and/or a service parameter associated with the user.

2. A method according to clause 1, in which the modifying step is performed in accordance with a profile of the user.

3. A method according to clause 1 or 2, in which the modifying step is performed based on a data service requested by the user.

4. A method according to any preceding clause, further comprising tracking the user within the network using information about handover and cell connections.

5. A method according to any preceding clause, further comprising calculating a probable user route between the current user location and the future user location.

6. A method according to any preceding clause, in which the predicting step includes predicting a series of future locations, the method further comprising calculating a probable user route based on the series.

7. A method according to clause 5 or 6, further comprising detecting user deviation away from the route.

8. A method according to clause 7, further comprising, in response to detection of user deviation away from the route, recalculating the route.

9. A method according to any preceding clause, in which the modifying step includes providing instructions to a base station of the telecommunication network.

10. A method according to any preceding clause, in which the base station is a base station located between the current user location and the future user location wherein the future user location is a white spot.

11. A method according to any preceding clause, in which the base station is a base station located adjacent the future user location within the network.

12. A method according to any preceding clause, in which the historical behaviour includes or is based on cell connections, cell measurements and/or requested data services.

13. A method according to any preceding clause, in which the modifying step comprises tilt adjustment of a base station of the telecommunication network.

14. A method according to any preceding clause, in which the modifying step comprises beam steering.

15. A method according to any preceding clause, in which the modifying step comprises configuration of handover parameters.

16. A method according to any preceding clause, in which the modifying step comprises expanding a cell range of the telecommunication network.

17. A method according to any preceding clause, in which the modifying step comprises increasing transmit power of a base station of the telecommunication network.

18. A method according to any preceding clause, in which the modifying step comprises adjusting resources scheduled to the user.

19. A method according to any preceding clause, in which the modifying step comprises traffic steering.

20. A method according to any preceding clause, in which the modifying step comprises identifying that the user is a priority user.

21. A method according to any preceding clause, in which the predicting step comprises performing statistical analysis on the data.

22. A network element of a telecommunication network adapted to control data service for a user, the network element adapted to carry out the steps of any of clauses 1 to 21.

23. A telecommunications network comprising a network element according to clause 22, a user equipment, a radio access network comprising a base station and a core network.

24. A computer program product comprising memory comprising instructions which when executed by one or more of the processors cause a network element of a telecommunication network to perform the method steps of any of clauses 1 to 21.

BRIEF DESCRIPTION OF THE DRAWINGS

An example of the present invention will now be described in detail with reference to the accompanying drawings, in which.

DETAILED DESCRIPTION

In the following description, reference may be made to Global System for Mobile Communications (GSM), Universal Mobile Telecommunications System (UMTS), Long Term Evolution (LTE) and to particular standards. However it should be understood that the present disclosure is not intended to be limited to these. The present invention may also be applicable to a number of modes of transmission such as Time Division Duplex (TDD), Frequency Division Duplex (FDD), Time Division-Synchronous Code Division Multiple Access (TD-SCDMA), and High Speed Downlink Packet Access (HSDPA), among others.

While devices are often referred to as "mobile" in the description herein, the term "mobile" should not be construed to require that a device always be mobile, merely that it has the capability of being in communication with a wireless telecommunications network which allows mobility. For instance, a PC terminal or a machine to machine client that is never moved from a particular geographic location may in a sense still be considered mobile as it could be moved to a different location yet still access the same network. Where the term "mobile device" is used in the present discussion it is to be read as including the possibility of a device that is "semi-permanent" or even "fixed" where the context does not contradict such an interpretation.

Figure 1:
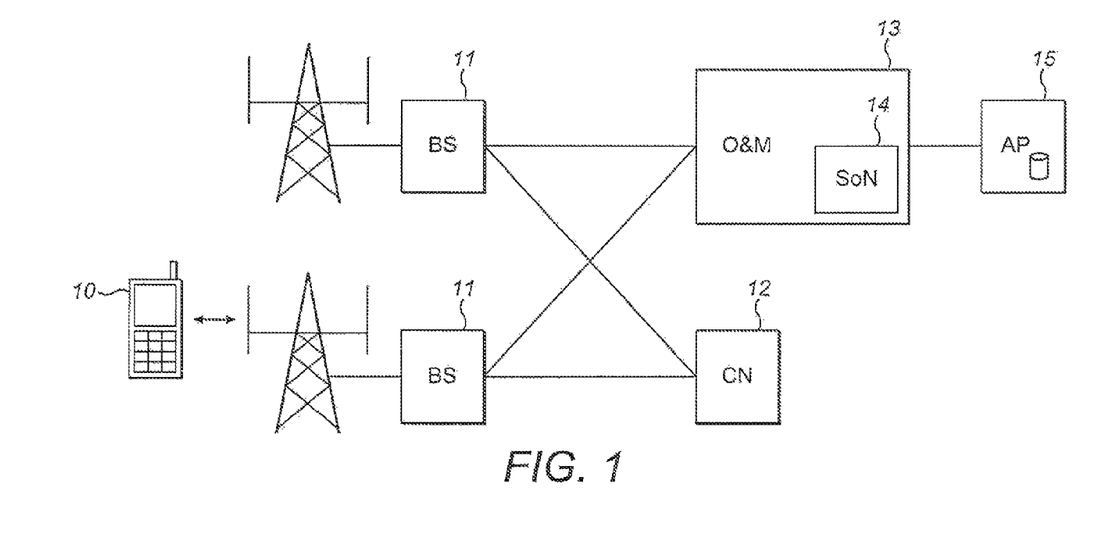
FIG. 1 shows an exemplary network architecture.

In a typical cellular radio telecommunications network, with reference to FIG. 1, a mobile device 10 communicates via one or more radio access networks (RAN, not shown) to one or more core networks 12. The RAN includes a plurality of base stations (BS) 11, each base station (BS) 11 corresponding to a respective cell of the telecommunications network. The devices 10 may be handheld mobile telephones, personal digital assistants (PDAs), smartphones, tablet computers or laptop computers equipped with a data card among others. In a UMTS or LTE system, such devices are typically referred to as User Equipment (UE). In a GSM system, such devices are typically referred to as Mobile Stations (MS). In the description herein both terms may be used interchangeably; however it will be noted that the term UE will be used predominantly.

Typical known methods of scheduling resources for UEs separate users into two categories, i.e. those users with priority and those users without. When a user enters a cell with high priority that user is given priority over other users in the cell. Priority is defined for example according to the service requested by the user and based on the level of data to be allocated to that user in order for that user to have constant service. A user can also be prioritised based on other factors such as data consumption and contract. A high priority data service may be a guaranteed bit rate (GBR) data service. GBR services may be conversational voice, conversational video (live streaming), real-time gaming services and non-conversational video (buffered streaming). Of course other services can be GBR services and the above are merely exemplary. A GBR value may be assigned which represents the bit rate that can be expected to be provided. Non-GBR services may be signalling and other data services such as email.

There is conventionally no consideration of the future radio conditions of a user when these priorities are assigned. A user is treated with priority only when radio coverage is available. When coverage is lost there are currently no measures taken by telecommunications networks to prevent a failure or reduction in the customer service.

Referring back to FIG. 1, each Base Station 11 also communicates with an Operations & Maintenance system (O&M) 13 which performs management functions for the network. Great emphasis has been made in recent years on the development of Self-organising networks (SONs) 14 which are a software tool forming part of the O&M system 13. These networks introduce smart functions within the network management domain of the network allowing tasks to be automated. SONs have three main aims and functionalities: self-configuration, self-optimisation and self-healing. Radio measurements performed by the base station 11 and the terminal 10 may be used to build an underlying trend of data performance such that non-real time optimisation tasks can be performed by the SON 14 to target network errors and increase the underlying data performance. These tasks typically include determining neighbour cell relationships, and configuring cell parameters to perform general optimisation of the radio environment. In summary, the SON 14 and O&M 13 may configure the BSs 11 in order to optimise network performance and increase the efficiency of the network based on the data received.

Recently it has become commonplace for network operators to store information received from terminals 10 and BSs 11 and pass this information to an analytics platform 15 which is operable to perform statistical analysis on the stored data to identify the 'habits' of the user for network optimisation or for commercial use. In this context, analytics typically means a platform of tools that collect information regarding user experience of any kind (location, performance, complaints, user habits etc.) and store this information in databases.

The analytics platform may be separate from or integral with the O&M 12. The information stored may be stored on a per UE basis or preferably on a per user basis. The information used by the analytics platform may include the type of UE operated by the user, the performance achieved during the day or the type of data services requested. Other information stored may include cell handover information, measurements received from the UE or made by the base stations and cell connection statistics. These are of course merely exemplary data only and it will be understood that any data available may be stored for subsequent analysis. The data can be configured to be stored for every user or for select users only.

The present invention utilises the data stored in the analytics platform 15 in order to predict the statistically probable future location of a terminal within the network. Based on this predicted location, the network can be configured to provide a consistent customer experience.

Figure 2:
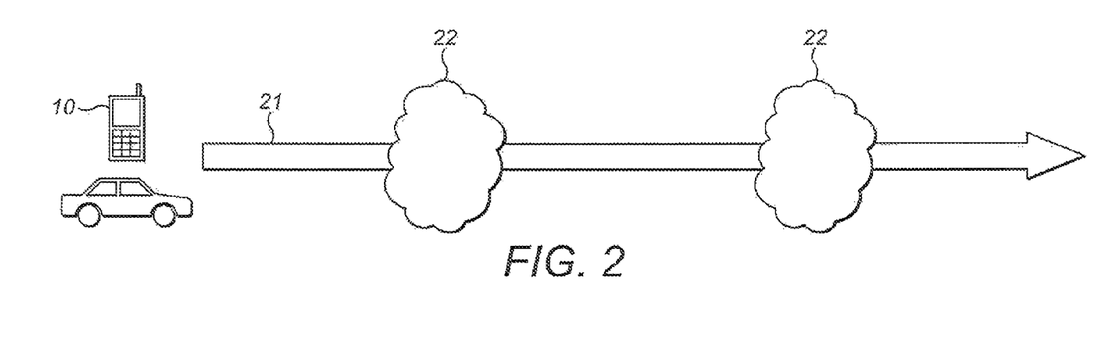
FIG. 2 shows a user travelling along a set route.

Throughout the description an example of a user travelling on the M4 motorway from London to Newbury will be used to illustrate different principles of the invention. Referring to FIG. 2, the user travelling along the M4 and operating a UE 10 may request a data service such as a music streaming service. The music streaming service may download the music into a buffer from a remote database for subsequent playback on the device. When the UE 10 travels along the route 21, it passes through two white spots 22 which cause the data service to be interrupted or lost completely. In this analogy, if the user is currently at a first junction of the motorway and a white spot 22 occurs at a later junction of the same motorway, conventional prediction methods will predict using the velocity of the UE that the user will experience the white spot and at what time. However, by analysing historical network behaviour associated with the user, the present algorithm is able to predict that in fact the user never gets to the later junction with the white spot, because every morning the user exits at an earlier junction. Thus, in accordance with the principles of the present invention and/or their implementation, there will be no prediction of experiencing a white spot.

Figure 3:
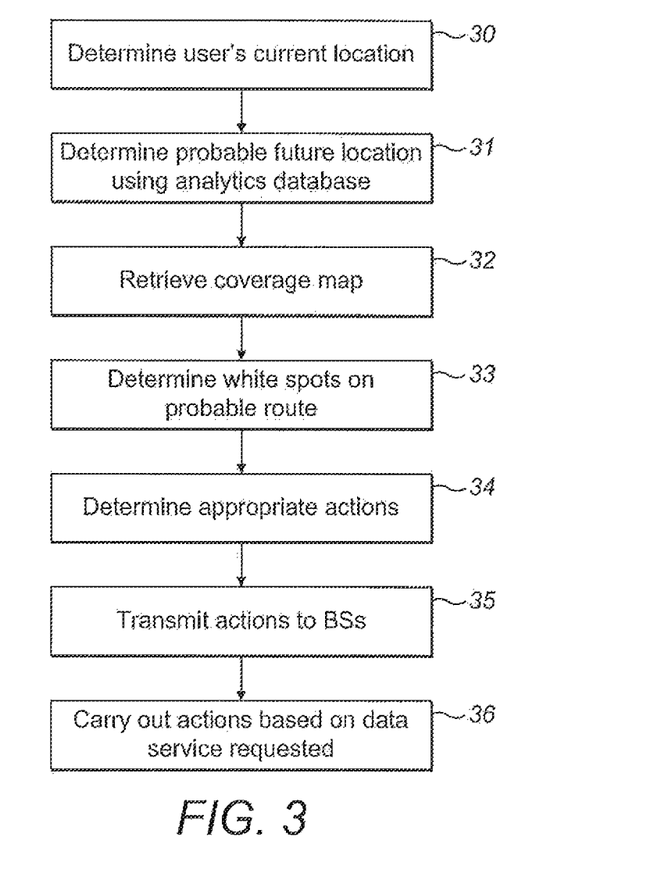
FIG. 3 is a flow diagram depicting a process according to an embodiment of the present invention.

FIG. 3 is a flow chart depicting the process carried out in accordance with an embodiment of the present invention to provide a consistent service to a user.

First, the network determines the current location of the user (step 30).

A variety of methods are envisaged for determining the location of the user operating a UE. In a first exemplary method, the base station may be operative to determine the location of the UE based on triangulation. For example, an analysis of communications with a plurality of base stations may result in the specific location of the UE being determined. If each base station knows its specific location through GPS, by triangulation, the specific location of the UE can be determined.

In a further exemplary method, the base station may be operable to request that the UE transmits its location in the form of a GPS signal. This method is known as GPS synchronisation. The UE may determine its location by using its GPS upon request and transmit the resulting values to the base station for use in location determination. To reduce processing requirements, the base station may be subsequently operable to assume that the GPS value is valid for a pre-determined amount of time.

In a further exemplary method, the base station may be operative to determine the location of the UE based on the angle of arrival of the signal.

The above methods of determining location may be used in isolation or in combination. A combination may be beneficial since it may increase the accuracy of the measurement. Alternatively a combination may be to reduce processing requirements. One method may be used in preference to another, for example, the GPS method may be used if available and another method used if it is not. Any other suitable method of determining the location of the UE may be used with the present invention.

Once the current location of the user is identified, the network is then operable to determine the probable future location of the user (step 31). To identify the probable future location, the network may perform a statistical analysis of data stored by the network. The analysis may be performed by the O&M 13 or by the analytics platform 15. As above, the stored data may include historical data of the behaviour of the user within the network.

Referring back to our example of the user travelling on the M4 motorway, if the user travels this same journey on a daily basis to work the stored data will indicate this. For example, the cell connections, determined location data, and base station power measurements will indicate a trend in use. By performing a statistical analysis on the stored data the network is able to determine that there is a high percentage chance that the user will be following a particular route.

When the user does actually move along the route the user can be tracked using cell handovers and cell connections in order to reduce processing requirements. Of course, the user can also be tracked along the route by making periodical assessments of the location of the user in the manner described above. If the user veers away from the predicted route then this information can be fed back into the location determining algorithm to iterate the process and recalculate a probable route and potential coverage anomalies.

For the purposes of the present example, it will be assumed that the user travels the same route every day and that the statistical analysis has determined that there is a 90% chance that the user will travel along the set route along the M4.

Next, the network will retrieve a coverage map (step 32). The coverage map can be manually generated or generated using an analysis of the data stored by the analytics platform for all users. For example, if five different UEs travel the route from London to Newbury and each suffer a service outage at the same place the analysis will determine that there is a white spot at that location. Additionally, if ten separate UEs notify the network of poor performance using a poor performance alert then this location can be added to the map as a weak link. Typically when a UE loses service completely a report is sent to the network indicating that the service has failed or that connectivity or handover has failed once connection is re-established. This data can be stored and forms part of the data used by the analysis to generate the coverage map. Any suitable data or alert can be used by the analysis platform 15 to generate the coverage map.

Analysis such as the above is able to determine how strong the signal is, how weak the signal is and other aspects of the signal which can be used to generate a very detailed coverage map. The coverage map can be configured according to the needs of the operator. For example, the map can be re-calculated periodically, i.e. every day, every month or every time a new node is added to the network, and the detail can be configured as required.

The coverage map can be generated in real-time, but typically this is not the case since the processing requirements are significant. The coverage map will depend on base station deployment and so is usually generated periodically. If a base station failure or outage is detected then an alarm may be generated in the network. Once this is identified the map may be updated either by rerunning the algorithm or making an amendment to the latest map.

Once the coverage map has been retrieved (step 32) the O&M 13 is operable to compare the predicted route of the user with the coverage map to determine potential white spots in coverage or other notable coverage anomalies such as areas of particularly good signal (step 33).

Referring back to our example, the O&M 13 has now determined that the user will probably be following the route of the M4 from London to Newbury since the user travels this same route every day and that along this route there are, for example, two potential white spots in coverage.

The O&M 13 is then operable, together with the SON 14 functionality to determine how to solve this problem and provide consistent service to that user including determining the appropriate actions to be taken (step 34). The actions that can be taken include any suitable configuration of the network and/or service parameters associated with the user to alleviate the effects of any coverage deficiencies on the service identified by the user. The actions may include modification of the any suitable configuration of the network and/or service parameters associated with the user before the user.

Once the appropriate actions have been identified, the actions are transmitted to the relevant Base Stations (step 35). Finally, the BS will carry out the action instructed by the O&M (step 36) and the effects of the white spots will be alleviated or removed such that there is no service gap and the user experience is consistent despite a loss of radio coverage.

Additionally, when the user connects to the relevant Base Station it may first check which service the user is requesting. If the service is a priority service such as downloading data or streaming audio, the BS 11 will carry out the actions instructed by the O&M 13. If the service is not a priority service then no actions may be taken. The level of service that should invoke action may also be instructed by the O&M 13.

The network may integrate a specific message to be sent to the UE or BS as part of the system.

In a first example of appropriate actions that can be taken, the network may carry out enhanced scheduling. In an example of enhanced scheduling, the BSs close to the bad area of coverage are requested by the O&M to allocate as many resources as possible to the user in accordance with the scheduling algorithm used so that as much data as possible is buffered at the UE to be used when there is no coverage.

Referring back to the example of the user travelling on the M4 from London to Newbury, the cell serving the area before the white spot on the route will allocate as many resources (e.g., resource blocks, data frames, etc.) as possible to the user so that the music streamed is buffered and can still be played while the user travels through the white spot along the route.

A similar principle applies to non-streaming applications. For example, the experience may be increased prior to the white spot when downloading data so that overall the user gets the same experience that would be offered if the white spot did not exist.

As described above, the actions that can be taken include any suitable configuration or combination of configurations of the network and/or service parameters associated with the user. These include, but are not limited to, the following:

Enhanced scheduling—Enhanced scheduling can be applied to offer more resources to specific users in order to cover their needs prior to a white spot. An example of enhance scheduling is described above.

Adjust tilt of BSs—The network is operable to remotely adjust, vertically or horizontally, the tilt of each base station in order to offer better coverage.

Beam steering functionality—BSs are operable to adjust their beam form and focus on a specific area, enhancing the coverage of that specific area and correspondingly the performance.

Handover configurations—The network is operable to change the handover parameters in order to delay a handover procedure if necessary. In this way the service of a user can be maintained for as long as possible before a loss of connectivity.

Cell range expansion—The network is operable to virtually expand the coverage of the cell. To do this, the network applies a bias value to measurements made by users in the cell edge area of a cell. In a UMTS cellular communication system, received signal code power (RSCP) denotes the power measured by a receiver on a particular physical communication channel. It is used as an indication of signal strength, as a handover criterion, in downlink power control, and to calculate path loss. Practically, when a user is estimating the RSCP value, a bias can be added that allows the total RSCP measurement to be improved and thereby keep a user connected to a cell. So, we have:

$$RSCP+Bias=RSCP_{new} \text{ (dB)}$$

In an example, when the user is the edge of the cell the RSCP is near the levels that Handover is triggered (e.g when RSCP<−90 dBm we trigger a Handover). Now the base station can apply Cell Range Expansion where, as indicated above, it applies a Bias value to the measurement of the device e.g if Bias=3 dB than when UE is actually measuring −90 dBm and should Handover, it calculates −90+3=−87 dBm and this way it continues to stay connected in the cell.

Increased transmit (Tx) power of BSs—Where necessary, the transmit power of the BS can be increased in order to offer better coverage in an area.

Traffic steering—If required, users can be offloaded to other layers such as Macro cells, small cells or Wi-Fi in order to enhance the experience before a white spot. This is particularly beneficial in Heterogeneous Networks (HetNets). HetNets are multi-layer networks with base stations of various sizes used to fill gaps in coverage and serve high use areas in order to increase user satisfaction and communication throughputs. The provision of HetNets is one way in which network operators are attempting to reduce the effects of white spots on the customer experience.

Once the actions have been carried out and the user moves to a different area or stops requesting the data service, the network can be returned to its normal configuration.

In one implementation of the described process, when the UE enters a specific location an alarm may be triggered in order to start the process. For example, when the user enters the M4 from London the network may raise an alarm that causes the future location to be determined. This alarm may be raised by the UE or the network. Alternatively, the process may be constantly run or may be run periodically. Additionally, the process may be triggered when a user requests a specific data service. For example, streaming audio may be defined as a particularly high priority data service such that it is important that constant service be provided. When this service is requested, the network may identify that it is a high priority service and accordingly may check the location and perform the remaining steps of the method.

The network may take into account the profile of the user when implementing the described process. For example, elements of the user profile that may be taken into account—as they may affect the service provided—include data consumption, contract details and payment information. For example the method may only be carried out for those users designated as important or high priority. This check may be performed prior to the route analysis or at the action implementation stage in the BS.

Additionally, the actions that may be taken by the BS may depend both on the service requested and the profile of the user. If an important user requests an important service then all actions may be available but an unimportant user may only be permitted certain actions and may be allocated resources according to their importance.

In an example of the described process, if there are cell users which are GBR and non-GBR, the network may treat the GBR users with higher priority meaning that when the new user (with GBR) enters the cell he is given priority over the non-GBR users. This is a conventional scheduling algorithm. The present solution proposes that that user is not only given priority but that scheduling also takes into consideration that he will soon enter a white spot. The user is given an even higher priority, taking more resources (intended for non-GBR users) than he would otherwise take using conventional scheduling algorithm in order to cover the needs of that user. GBR users are defined according to the service and based on that the network may determine the level of data to be allocated to the user in order to have constant service.

Figure 4:
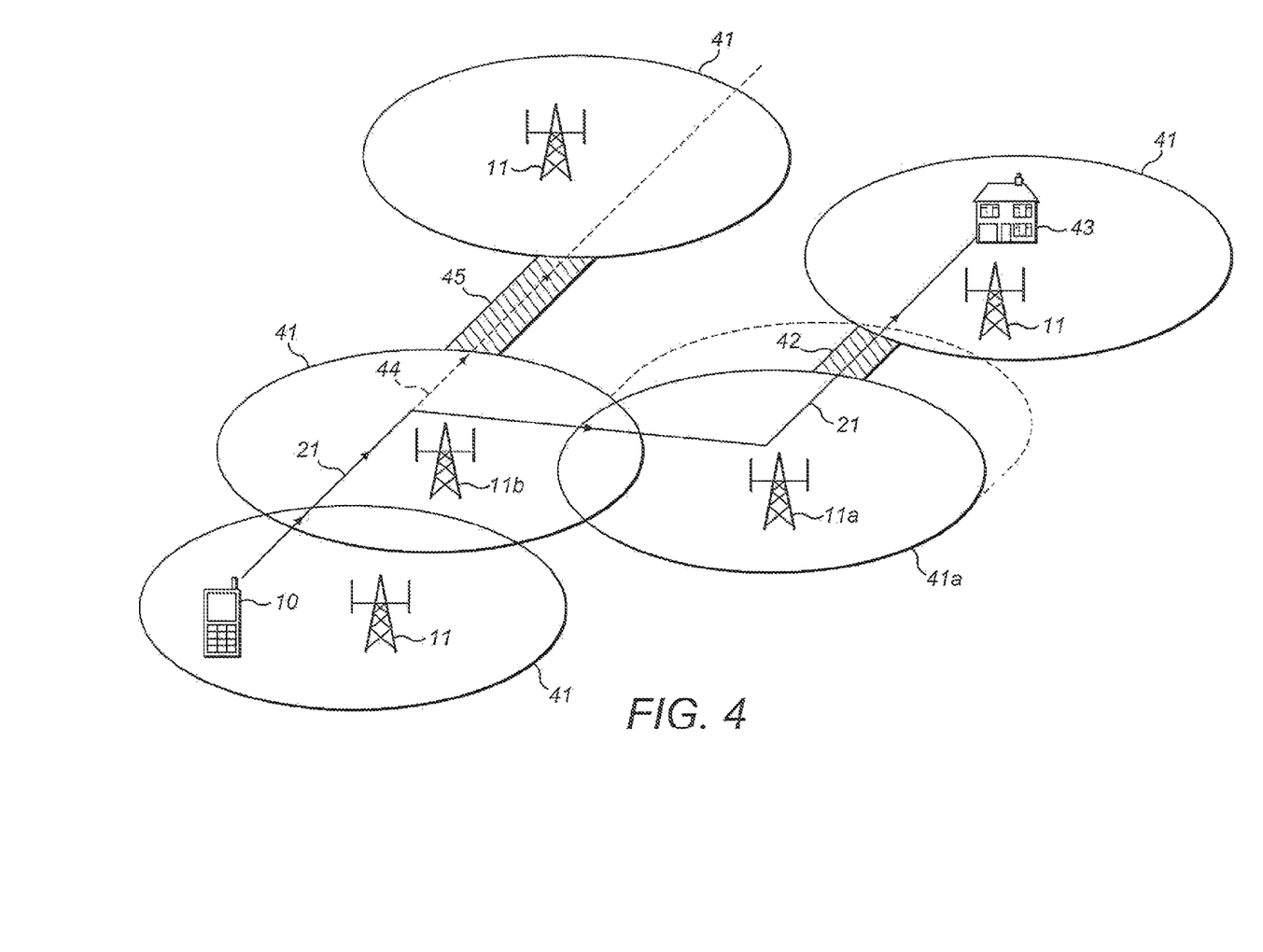
FIG. 4 illustrates schematically a user travelling through a series of cell areas.

The above method will now be summarised in the context of the schematic illustration of FIG. 4. A user operating UE 10, travels along a route 21 passing through the cell areas 41 covered by several Base Stations 11. Based on a statistical analysis of the historical behaviour of the user within the network, the network is able to predict that the user will travel along this route and will encounter a white spot 42 by consulting a coverage map. In order that consistent service be provided to this user 10, who is determined to be a VIP, the base station 11*a* is instructed by the O&M to vary its coverage area by either adjusting the tilt of the base station or by beam forming. As indicated by the dotted line, the cell area 41*a* is expanded so that the white spot does not affect the user and a consistent experience is provided to user until it reaches its destination 43.

Also illustrated in FIG. 4 is the route that would be predicted if known methods based on velocity and current location were used to determine potential white spots. If the user began travelling on route 21 and did not veer off as predicted using analysis of historical behaviour, then it would be assumed that route 44 would be followed. This would lead the user 10 to white spot 45. Accordingly, the O&M might incorrectly and unnecessarily instruct Base Station 11*b* to alter its behaviour, possibly be scheduling resources to the user unnecessarily to the detriment of other users.

Gateway-Based Implementations

Another application of the present invention will now be discussed with reference to implementation for use on board a public transportation vehicle, such as a train, coach or bus, particularly when such a vehicle is travelling at high speed. With reference to a vehicle-based user (such as on board a public transportation vehicle), suitability for use at high speed may mean at least 50 km/hr, 70 km/hr, 90 km/hr, 100 km/hr, 130 km/hr, 150 km/hr, 175 km/hr or 200 km/hr. Predicting the location of a user based on a public transportation vehicle (or similar) may be more straightforward than for other users, because the location of the user may be constrained to a pre-established route (either physically, for example with a train, or by planning, for instance with a bus). Based on the current time and knowledge of the vehicles timetable or scheduling information, which may be considered historical data for the vehicle-based user, it may be possible to determine its location to a degree of approximation. Further location-based information, as identified herein, may be used in addition or alternatively to establish the predicted location.

In such cases, a gateway may be provided on board the vehicle. User devices (such as UEs, although not necessarily so) on board may access the telecommunications network through the gateway, rather than directly. This may have advantages. For example, the gateway may be optimised for communication with the telecommunications network and may therefore be able to receive a higher QoS (in terms of bit rate, error rate and similar) than each user device may be able to receive by directly communicating with the network. Also, the user devices need not necessarily be subscriber devices for the particular network with which the gateway communicates. Indeed, the gateway may communicate with the user devices through a different radio access technology than the user devices use for communication with the gateway. For example, the user devices may use a WiFi protocol or licence free technology for communication with the gateway, whilst the gateway may use a cellular radio access technology (such as those defined by the GSM, UMTS or LTE standards) for communication with the network. A gateway may automatically have a higher priority at the network (in terms of scheduling, for instance) than other users, but may otherwise be treated in the same way as other users.

The gateway may be considered as a single user by the network. When the network modifies its configuration for the gateway user based on the gateway user's predicted location, the gateway may act as a storage device to store data for future communication to the user device or devices when the vehicle passes through a region of degraded or unavailable network coverage. This storage can be used for buffering of streaming data, as discussed above or for caching data for use by one or more user devices at any subsequent time, such as web pages. The user devices may require different services or some or all may require the same service. One user device may be using multiple services from the network.

Figure 5:
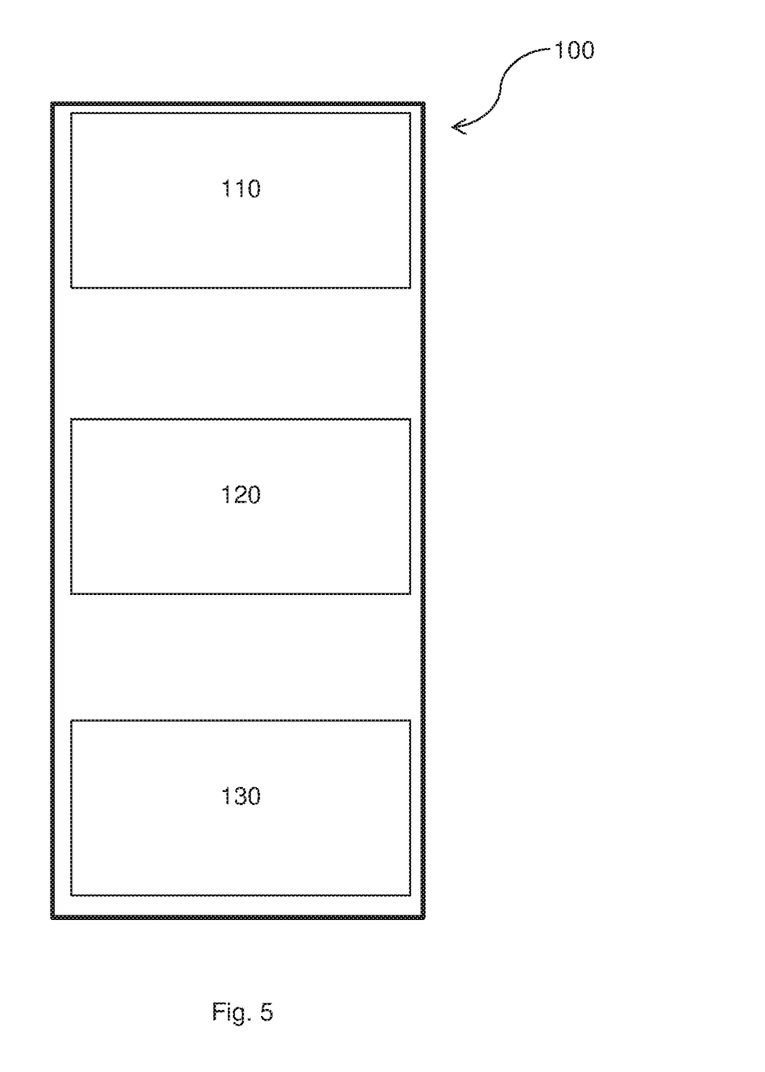
FIG. 5 schematically depicts a gateway according to another embodiment of the invention.

Referring now to FIG. 5, there is schematically depicted a gateway in accordance with an embodiment. The gateway 100 comprises: a first communication interface 110, for communication between the gateway and the network; a second communication interface 120, for communication between the gateway and the user devices (although there may only one); and a storage system 130. The storage system may 120 be used in response to a network modification (or indeed, continuously) to store data for future communication to a user device or user devices via the second communication interface 120.

The following example may illustrate this more clearly. A gateway may provide service to 5 users, requiring: one video call, one voice call, one streaming service, one file download, and one web browsing session. The network predicts a poor coverage area ahead of the gateway and detects that the gateway has high priority and provides sensitive services. It augments, for instance, the radio resources the gateway is assigned. By one or more of: signalling; historical profile of the journey; a change of the network parameters; or other means, the gateway can also detect the bad coverage area ahead. In response, it may act to do one or more of the following:

1. prioritise some services over others (for example, by shifting newly obtained resources, due to the network modification, towards the streaming and download service);

2. update its cache, for example by: a) updating all pages which are in the cache and/or b) predictively caching content which is usually accessed at this journey and time; and 3. maintain the calls and web browsing session on a reasonable level.

When the gateway then enters the area of poor coverage, only a small number of transmission resources may be available. These can then be (nearly) entirely allocated to the interactive services, such as calls (and web browsing where necessary). File download and stream services may be maintained from the cache. Once the gateway leaves the poor coverage area, its operation returns to normal.

It will be understood that the gateway embodiment may have any of the features of the other embodiments or implementations described herein.

The invention claimed is:

1. A method for controlling data service for a vehicle-based gateway operating in a telecommunication network, wherein the vehicle-based gateway is configured to communicate with the telecommunication network using a first communication interface and to provide access to the telecommunication network to a plurality of user devices onboard a vehicle using a second communication interface, the method comprising:
retrieving data associated with location behavior of the vehicle-based gateway within the telecommunication network;
predicting, based on said data and on a current location for the vehicle-based gateway within the telecommunication network, a future location for the vehicle-based gateway within the telecommunication network;
performing a determination of network capability at the future location for the vehicle-based gateway to identify a degradation in a link quality of the first communication interface;
modifying, in response to the identification, a configuration of the network and/or a service parameter associated with the vehicle-based gateway; and
performing, in response to the step of modifying, one or more of:
a) prioritizing some services over others;
b) communicating data from the network to the vehicle-based gateway for storage in a storage system at the vehicle-based gateway and caching the communicated data for use during a time period when the vehicle-based gateway is in the future location within the network; and
c) maintaining any calls and web-browsing sessions provided by the telecommunications network at a predetermined level.

2. A method according to claim 1, wherein the data associated with location behavior of the vehicle-based gateway within the network comprises scheduling information for the vehicle.

3. A method according to claim 1, wherein the step of performing a determination of network capability at the future location comprises determining that an expected communication throughput between the telecommunication network and the vehicle-based gateway at the future location is no greater than a predetermined threshold.

4. A method according to claim 1, wherein the modifying step is performed based on one or more of: a profile of the vehicle-based gateway; and a data service requested by the vehicle-based gateway.

5. A method according to claim 1, wherein the modifying step further comprises one or more of: tilt adjustment of a base station of the telecommunication network; beam steering; configuration of handover parameters; expanding a cell range of the telecommunication network; increasing transmit power of a base station of the telecommunication network; adjusting resources scheduled to the vehicle-based gateway; traffic steering; adjusting a priority of the vehicle-based gateway; and identifying that the vehicle-based gateway is a priority user.

6. A method according to claim 1, further comprising: establishing at the vehicle-based gateway that the configuration of the network and/or the service parameter associated with the vehicle-based gateway has been modified.

7. A method according to claim 6, further comprising: using the stored data during a time period when the vehicle-based gateway is located at the future location within the network.

8. A method according to claim 7, wherein the step of using the stored data comprises communicating the stored data and/or information relating to the stored data from the vehicle-based gateway to at least one of the plurality of user devices in communication with the vehicle-based gateway.

9. A method according to claim 1, wherein the step of communicating data and caching the communicated data comprises one or more of:
updating all pages stored in a cache of the vehicle-based gateway; and
caching content which is usually accessed at this journey and time.

10. A non-transitory computer readable medium comprising instructions that when executed by one or more processors of a telecommunications network cause the telecommunications network to carry out the method of claim 1.

11. A network element of a telecommunication network adapted to control data service for a user, the network element adapted to carry out the method of claim 1.

* * * * *